(12) United States Patent
Ellard

(10) Patent No.: US 8,341,872 B2
(45) Date of Patent: Jan. 1, 2013

(54) MAGNETIC SLIP BOBBER

(75) Inventor: Lee Ellard, Antioch, TN (US)

(73) Assignee: Lee Ellard, Antioch, TN (US)

( * ) Notice: Subject to any disclaimer, the term of this patent is extended or adjusted under 35 U.S.C. 154(b) by 0 days.

(21) Appl. No.: 12/800,854

(22) Filed: May 24, 2010

(65) Prior Publication Data

US 2010/0293836 A1  Nov. 25, 2010

Related U.S. Application Data

(60) Provisional application No. 61/216,908, filed on May 22, 2009.

(51) Int. Cl.
*A01K 93/00* (2006.01)
(52) U.S. Cl. .................. 43/44.9; 43/44.91; 43/44.87
(58) Field of Classification Search .................. 43/43.1, 43/44.87, 44.9, 44.91
See application file for complete search history.

(56) References Cited

U.S. PATENT DOCUMENTS

| | | | | |
|---|---|---|---|---|
| 786,597 A * | 4/1905 | Picken | | 43/44.9 |
| 1,489,088 A * | 4/1924 | McMindes | | 43/44.9 |
| 2,571,808 A * | 10/1951 | Aldinger, Jr. | | 43/44.91 |
| 2,741,864 A * | 4/1956 | Shotton | | 43/44.9 |
| 2,847,792 A * | 8/1958 | Kuhlmann | | 43/44.9 |
| 2,952,937 A * | 9/1960 | Wassing | | 43/44.9 |
| 3,032,913 A * | 5/1962 | Voll | | 43/44.91 |
| 3,180,051 A * | 4/1965 | Freeman | | 43/44.91 |
| 3,733,734 A * | 5/1973 | Hysaw | | 43/44.9 |
| 3,798,825 A * | 3/1974 | Popeil | | 43/44.9 |
| 4,268,988 A * | 5/1981 | Johnson, Jr. II | | 43/44.9 |
| 4,458,439 A * | 7/1984 | Garrett, Sr. | | 43/44.91 |
| 4,610,104 A * | 9/1986 | Garcia | | 43/44.9 |
| 5,274,945 A * | 1/1994 | Ross | | 43/44.91 |
| 5,279,066 A * | 1/1994 | Camera | | 43/44.9 |
| 5,361,532 A * | 11/1994 | Moff | | 43/44.9 |
| 5,456,041 A * | 10/1995 | Schoeberlein | | 43/44.91 |
| 6,405,474 B1 * | 6/2002 | Taunton | | 43/44.9 |
| 6,421,950 B1 * | 7/2002 | Constantin | | 43/44.98 |
| 6,550,179 B1 * | 4/2003 | Seay | | 43/44.91 |
| 7,437,850 B1 * | 10/2008 | Seay et al. | | 43/44.91 |
| 7,490,433 B2 * | 2/2009 | Schoenike | | 43/44.91 |
| 8,161,678 B1 * | 4/2012 | Delucca | | 43/44.9 |
| 2009/0056197 A1 * | 3/2009 | Schoenike | | 43/44.91 |

FOREIGN PATENT DOCUMENTS

| | | | | |
|---|---|---|---|---|
| JP | 03112430 A | * | 5/1991 | |
| JP | 08205736 A | * | 8/1996 | |
| JP | 08228649 A | * | 9/1996 | |
| JP | 09238604 A | * | 9/1997 | |
| JP | 2004275164 A | * | 10/2004 | |

(Continued)

*Primary Examiner* — Darren W Ark
(74) *Attorney, Agent, or Firm* — Warn Partners, P.C.

(57) ABSTRACT

The present invention is directed to a magnetic slip bobber used for connecting and disconnecting a slip bobber to a location on a fishing line. The magnetic slip bobber of the present invention includes a slip bobber selectively connected to a fishing line, where the fishing line extends through the slip bobber. The invention also includes a magnet connected to the slip bobber. An aperture is formed as part of the magnet, and the fishing line is operable for extending through the aperture formed as part of the magnet. A line-stop is mounted to the fishing line operable for being selectively connected to the magnet such that when the fishing line is cast into a body of water, the slip bobber moves along the fishing line until the line-stop contacts the magnet, thereby maintaining a predetermined depth of a hook attached to the fishing line.

19 Claims, 3 Drawing Sheets

FOREIGN PATENT DOCUMENTS

| | | | |
|---|---|---|---|
| JP | 2010142135 A * | 7/2010 | |
| WO | WO 9524123 A1 * | 9/1995 | |
| WO | WO 02091822 A1 * | 11/2002 | |

* cited by examiner

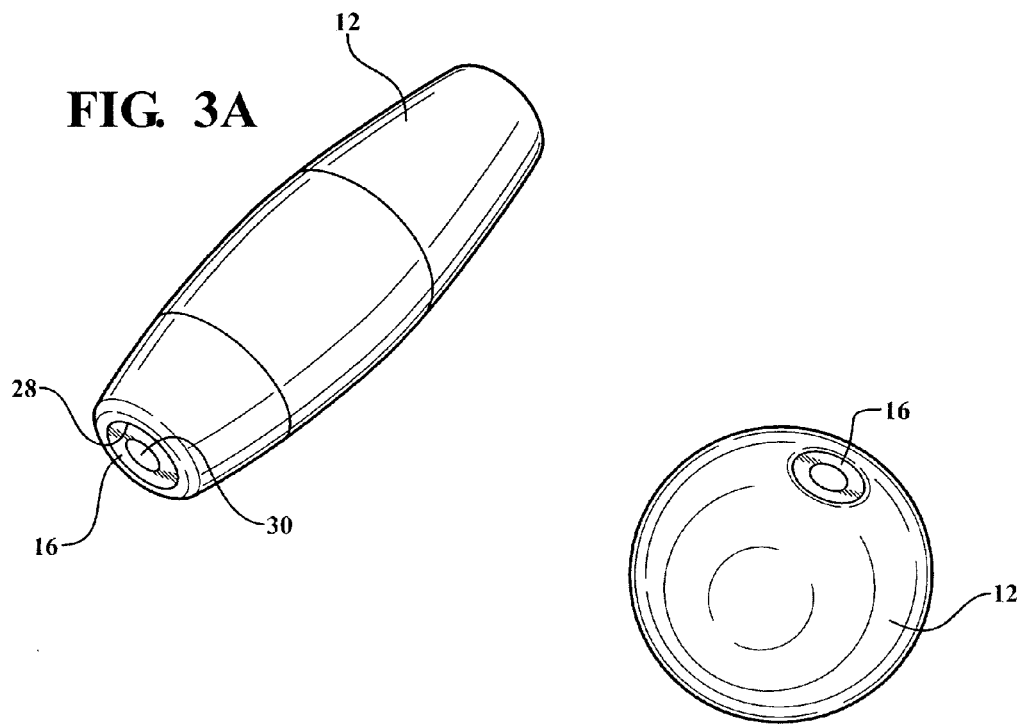
FIG. 3A
FIG. 3B
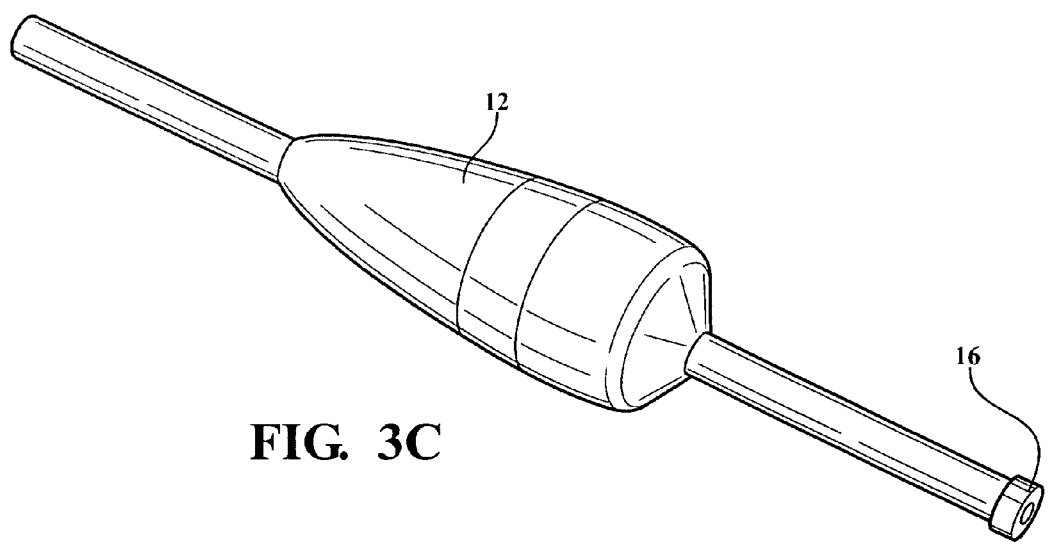
FIG. 3C

MAGNETIC SLIP BOBBER

CROSS-REFERENCE TO RELATED APPLICATIONS

This application claims the benefit of U.S. Provisional Application No. 61/216,908, filed May 22, 2009. The disclosure of the application is incorporated herein by reference.

FIELD OF THE INVENTION

The present invention relates to an automatic locking slip bobber or slip cork which maintains the depth of fishing bait at a consistent depth while fishing.

BACKGROUND OF THE INVENTION

Traditional slip bobbers or "slip corks" are used during fishing to provide an indication that the hook (and the bait on the hook) on the end of the fishing line placed in the water is being eaten or at the very least moved by a fish. Current slip corks are connected to the fishing line in either one of two ways: (1) the bobber is allowed to slip along the fishing line until it comes to a line-stop at the proper depth, but the line-stop does not lock the bobber in place, i.e. it allows the bobber to slip freely between the bobber and the hook or (2) the bobber is attached to the line so that the bobber does not slip along the fishing line. In either case, the distance between the hook and the slip cork is the depth the bait is located when fishing.

Current types of slip corks have been met with several drawbacks. Slip corks which are always allowed to slip fail to maintain the fishing bait at the desired or a consistent depth. Slip corks which are permanently attached to the fishing line may be sufficient when fishing in shallower bodies of water, but present difficulties when fishing at greater depths because there is a greater amount of fishing line between the slip cork and the hook. This larger amount of fishing line between the hook and the slip cork (the amount of fishing line between the hook and the slip cork is also referred to as a "cast leader") increases the difficulty when casting the line into the water.

There are some types of slip corks that may be locked in place at a desired depth, but current designs for these types require that the slip cork be locked in place prior to casting, which can create a cast leader of increased length which is difficult or impossible to cast (e.g. if you are trying to fish at a depth of 15' or more).

One example of fishing in which a prior art slip cork is used is traditional "float and fly" fishing. This type of fishing employs a bobber or slip cork fixed to the fishing line with no way of automatically locking or unlocking the bobber. Typically, the "fly," which is actually a small lead head hair jig, is fished at a depth of 10'-15' below the bobber, creating a long cast-leader which is difficult to cast. Other types of fishing include using a lure or bait which typically sinks when not retrieved (such as a swimbait, spinnerbait, or lipless crank bait), and which is difficult to maintain at consistent depths when presenting or retrieving the lure.

Accordingly, there exists a need for an improved slip bobber or slip cork which allows for consistently fishing at various depths, and while eliminating a long cast leader.

SUMMARY OF THE INVENTION

The present invention is directed to a magnetic slip bobber used for connecting and disconnecting a slip bobber to a location on a fishing line. The magnetic slip bobber of the present invention includes a slip bobber selectively connected to a fishing line, where the fishing line extends through the slip bobber. The present invention also includes a magnet connected to the slip bobber. An aperture is formed as part of the magnet, and the fishing line is operable for extending through the aperture formed as part of the magnet. A line-stop is mounted to the fishing line operable for being selectively connected to the magnet such that when the fishing line is cast into a body of water, the slip bobber moves along the fishing line until the line-stop contacts the magnet, thereby maintaining a predetermined depth of a hook attached to the fishing line.

Accordingly, it is one object of the present invention to provide a slip cork or bobber which has the features of connecting and disconnecting a slip cork (i.e., a "slip float", "slip bobber", etc.) to a fishing line automatically, without having to manually intervene to fix the cork to the line.

The line-stop is threaded onto the fishing line, and the line-stop is made of material that is attracted to magnets (e.g. steel). The line-stop of the present invention is small enough and streamlined enough to easily pass through the eyes of a fishing rod, and is able to reel and de-reel from a fishing reel without "snagging" in the spool of fishing line. The line-stop may be "set" (e.g. with super glue, or some type of additional device operable for use with various types of slip corks or slip bobbers) at the fishing depth desired.

The magnet of the present invention is permanently attached (e.g. with super glue or some other type of adhesive) to the slip cork. The magnet and slip cork each have a hole or aperture for the fishing line to pass through. The "slip cork with magnet" is threaded onto the line with the portion of the slip cork having the magnet facing the line-stop. The slip cork is able to freely move along the fishing line until the magnet contacts the line-stop, at which point the magnet attracts the line-stop such that the line-stop contacts and stays connected to the magnet, thereby locking the slip cork in place at a specific location along the fishing line.

This automatic locking performed by the magnet and line-stop is an advantage over the prior art because the magnet holds the line-stop with enough force so that the hook and bait stays at the desired depth while the fishing line is worked, or the hook is retrieved. To release the magnetic lock, the fishing rod is simply tipped sharply, or jerked, to break the magnetic connection between the magnet and the line-stop. Alternatively, the line may be reeled in until the slip cork hits the eye on the end of the fishing rod and the magnetic connection between the magnet and the line-stop is broken. The fishing line, including the line-stop, is then reeled onto the reel, eliminating the need for a long cast leader.

The automatic locking between the magnet and the line stop presents an advantage over the use of either a traditional "slip cork" or "fixed cork." This magnetic slip bobber of the present invention allows fishermen to present bait/lures in subtle, slow presentations to fish suspended at any level in the water column, and keep the presentation in that water zone indefinitely. Suspended fish, especially when suspended high in the water column (i.e. not near bottom), are often the most difficult to present to, and to elicit a bite from.

One particular improvement of the present invention over traditional float-and-fly fishing is that the magnetic slip bobber of the present invention allows for a fly to be easily cast, fished, and retrieved at any desired depth, even much deeper than the depths of 10'-15' normally used for float-and-fly fishing. Furthermore, any lure or bait which normally sinks when not retrieved, such as a swimbait or lipless crank bait, may be fished suspended in the water, and moved slowly if desired, at virtually any depth, for a different presentation than the traditional presentation.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 3A is a perspective view of an alternate embodiment of a magnetic slip bobber, according to the present invention;

FIG. 3B is a perspective view of another alternate embodiment of a magnetic slip bobber, according to the present invention;

FIG. 3C is a perspective view of yet another alternative embodiment of a magnetic slip bobber, according to the present invention;

DETAILED DESCRIPTION OF THE PREFERRED EMBODIMENTS

Figure 1:
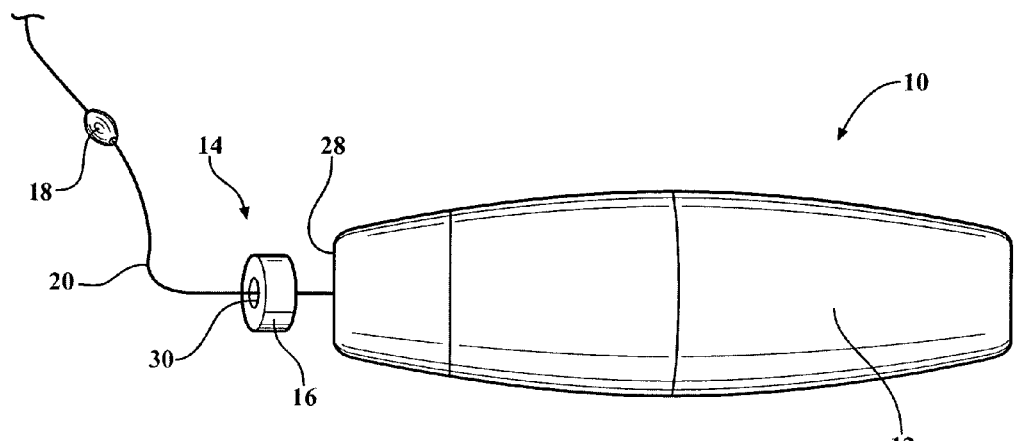
FIG. 1 is an exploded view of a magnetic slip bobber, according to the present invention.

The following description of the preferred embodiment(s) is merely exemplary in nature and is in no way intended to limit the invention, its application, or uses.

A magnetic slip bobber according to the present invention is shown in the Figures generally 10. The magnetic slip bobber 10 includes a flotation portion (also referred to as a slip bobber or slip cork) 12, along with a locking portion, generally shown at 14. The locking portion 14 includes a magnet 16 and a line-stop 18, and the line-stop 18 is connected to a fishing line 20.

In this embodiment, the line-stop 18 is made of a soft, non-abrasive material having a very smooth surface, such as, but not limited to, low-carbon steel. The line-stop 18 is made of a material that is attracted to magnets, such as the magnet 16 shown in the Figures. The line-stop 18 of the present invention is of a dimension small enough and streamlined enough to pass through the eyes of a fishing rod, and also is able to reel and de-reel from a fishing reel without becoming caught or tangled in the fishing line 20.

Figure 4:
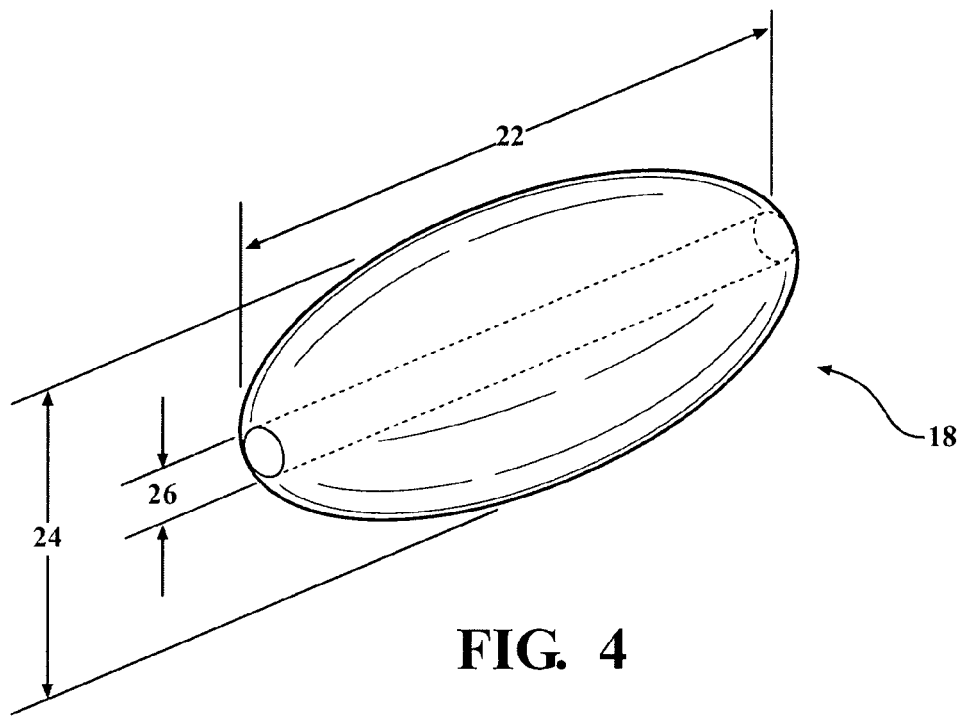
FIG. 4 is a top view of a line-stop used for a magnetic slip bobber, according to the present invention.

Referring to FIG. 4, one embodiment of a line-stop 18 is shown, where the line-stop 18 is substantially oval in shape and has a width 22 of about 0.3125 inches, and a height 24 of about 0.09375 inches. Extending through the line-stop 18 is an aperture 26 having a diameter 26 of about 0.040 inches. However, it is within the scope of the invention that the aperture 26 may be a slit at least part of the way through the line stop 18, to reduce the cost of manufacturing.

Figure 2:
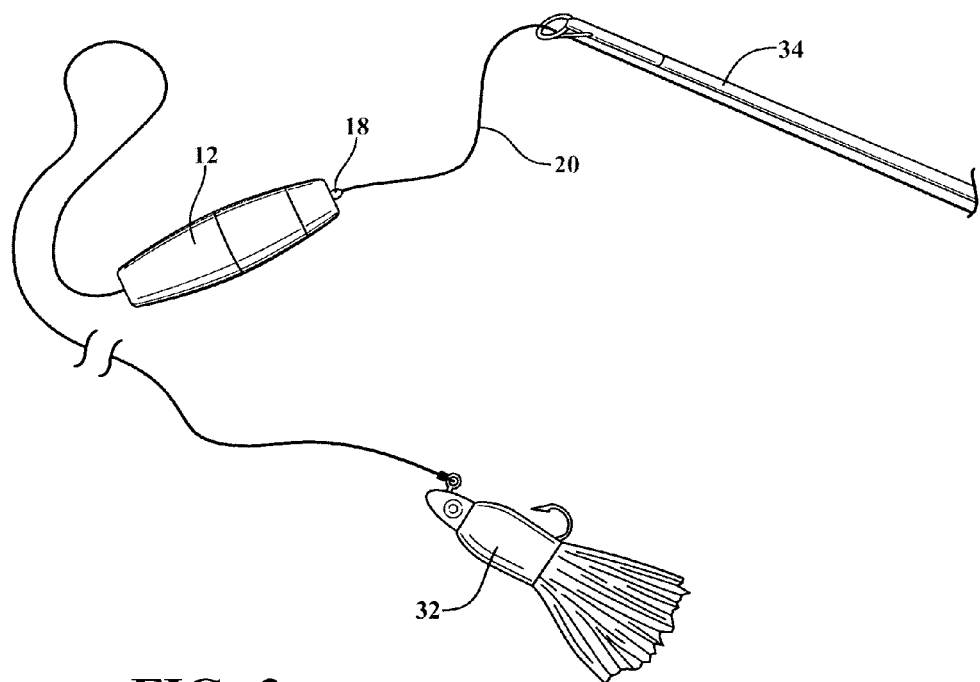
FIG. 2 is a perspective view of a magnetic slip bobber attached to a fishing line, according to the present invention.

Referring again to the Figures generally, slip bobber 12 includes a receiving area 28 which is suitable for receiving the magnet 16, and the magnet 16 includes an aperture 30 which is in substantial alignment with an aperture (not shown) formed as part of the slip bobber 12. The fishing line 20 extends through the aperture formed as part of the slip bobber 12 and the aperture 30 of the magnet 16, best seen in FIG. 2. The fishing line 20 is also connected to a hook 32 and is connected to a fishing pole 34.

The line-stop 18 is mounted to the fishing line 20 at a distance from the hook 32 to place the hook 32 at the desired fishing depth when the hook 32 is in the water. For example, if it is desired to have the hook 32 located at a depth of fifteen feet in the water, the line-stop 18 is simply mounted to the fishing line 20 at a distance of about fifteen feet from the hook 32.

When it is desired to use the magnetic slip bobber 10 of the present invention, the fishing line 20, hook 32, and slip bobber 12 are cast into the water. As the hook 32 (and the bait placed on the hook 32) sinks downwardly into the water, the fishing line 20 moves through the aperture formed as part of the slip bobber 12 and the aperture 30 of the magnet 16 until the line-stop 18 reaches the magnet 16, and becomes attached to the magnet 16. Because the line-stop 18 is positioned by the user to have the hook 32 located at a desired depth, this prevents the hook 32 from descending further into the water than desired. The connection between the line-stop 18 and the magnet 16 allows the user to work the bait on the hook 32 slowly, or slowly retrieve the hook 32 without disconnecting the line-stop 18 from the magnet 16.

When it is desired to release the line-stop 18 from the magnet 16, the user simply applies a sudden force, or "jerk," to the fishing pole 34, and therefore the fishing line 20, to cause the line-stop 18 to disconnect from the magnet 16, allowing the user to reel in the fishing line 20 as desired. Alternatively, the user may simply begin reeling in the fishing line 20 until the slip bobber 12 contacts the outermost eye on the end of the fishing pole 34. Since the slip bobber 12 cannot fit through the eyes of the fishing pole 34, the line-stop 18 becomes disconnected from the magnet 16 as the fishing line 20 is reeled in.

Alternative embodiments of the slip bobber 12 are shown in FIGS. 3A-3C. The slip bobbers 12 are of different shapes, but essentially perform the same function.

Figure 5:
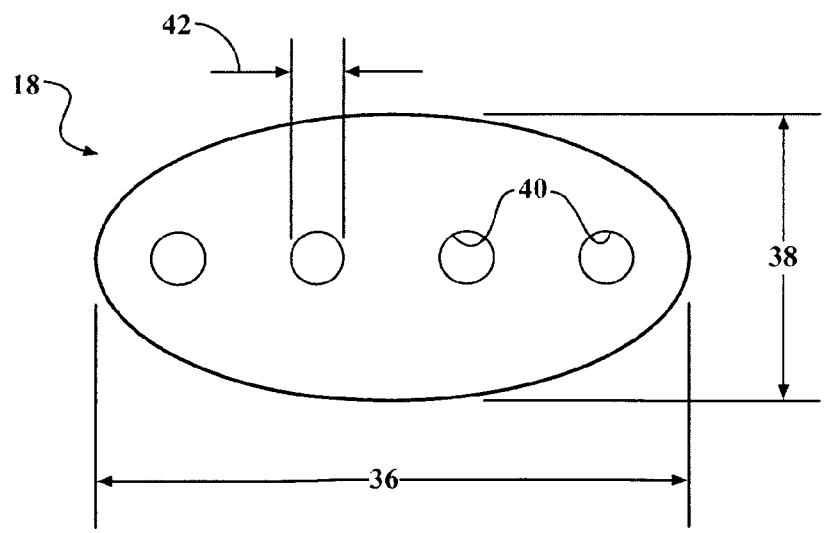
FIG. 5 is a top view of an alternative of a line-stop used for a magnetic slip bobber, according to the present invention.

While the line-stop 18 of the present invention has been shown having the above mentioned dimensions, it is within the scope of the invention that line-stops 18 of other dimensions may be used. For example, FIG. 5 shows an alternatively shaped line-stop 18 as compared to the other Figures. The line-stop 18 shown in FIG. 5 has a width 36 of about eight millimeters, and a height 38 of about three millimeters. There is also a plurality of apertures 40, each having a diameter 42 of about 0.6 millimeters. The line-stop 18 in FIG. 5 is substantially flat, and has a thickness of about 0.5 millimeters.

While the magnetic slip bobber 10 of the present invention has been shown in include a magnet 16 to provide for the automatic locking, it is within the scope of the invention that other types of magnet-attractive materials to selectively connect the slip bobber to the line-stop may be used. It is also within the scope of the invention to include any locking mechanism that affixes a slip bobber or slip cork such that the fishing line does not move freely up and down the fishing line below the line-stop.

In an additional alternate embodiment, instead of the magnet 16 being attached to the bobber 12, the bobber 12 may include a component operable to be attracted to a magnet, and the line-stop 18 may be made of a magnetic material to provide the connection to the bobber 12.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A magnetic slip bobber, comprising:
a fishing line having a first end and a second end, said first end for attaching to a fishing pole, and a hook located on said second end;
a slip bobber selectively slidably connected to said fishing line, said fishing line operable for extending through said slip bobber;
a magnet connected to a fishing pole end of said slip bobber;
an aperture formed as part of said magnet, said fishing line operable for extending through said aperture formed as part of said magnet;
a line-stop made of a material attracted to said magnet mounted to said fishing line at a location between said fishing pole end of said slip bobber and said first end of said fishing line operable for being selectively connected to said magnet such that when said fishing line is cast into a body of water, said slip bobber moves along said fishing line until said line-stop contacts said magnet, thereby maintaining said hook attached to said second end of said fishing line below a hook end portion of said slip bobber at a predetermined depth; and
wherein an outside diameter of said line-stop is greater than a diameter of said aperture for preventing said line-stop from moving in a direction past the magnet upon a fish striking the hook such that the slip bobber and line-stop travel as a unit with said fishing line under tension and allows selective release between said slip bobber and said line-stop upon reeling said fishing line toward said fishing pole.

2. The magnetic slip bobber of claim 1, said slip bobber further comprising a receiving area, said magnet mounted in said receiving area.

3. The magnetic slip bobber of claim 1, further comprising an aperture formed as part of said line-stop, said fishing line operable for extending through said aperture formed as part of said line-stop.

4. The magnetic slip bobber of claim 1, said line-stop being connected to said fishing line through the use of an adhesive.

5. The magnetic slip bobber of claim 1, wherein said line-stop is disconnected from said slip bobber by applying a sudden force to said fishing line.

6. The magnetic slip bobber of claim 1, wherein said line-stop is made from a magnetic material.

7. A magnetic slip bobber, comprising:
a fishing line having a first end and a second end, said first end for attaching to a fishing pole, and a hook located on said second end;
a slip bobber slidably mounted on said fishing line, said hook being disposed on said second end of said fishing line below a hook end portion of said slip bobber;
a magnet mounted to said slip bobber on a fishing pole end of said slip bopper, said fishing pole end comprising a receiving area;
a line-stop made of a material attracted to said magnet attached to said fishing line at a location between said receiving area having said magnet and said first end of said fishing line, said line-stop magnetically connectable to said magnet such that when said line-stop is connected to said magnet, said hook is located at a predetermined distance from said slip bobber; and
an aperture formed through said magnet, said fishing line operable for extending through said aperture formed through said magnet, wherein an outside diameter of said line-stop is greater than a diameter of said aperture for preventing said line-stop from moving in a direction past the magnet upon a fish striking the hook such that the slip bobber and line-stop travel as a unit with said fishing line under tension and allows selective release between said slip bobber and said line-stop upon reeling said fishing line toward said fishing pole.

8. The magnetic slip bobber of claim 7, further comprising:
an aperture formed as part of said slip bobber substantially aligned with said aperture formed through said magnet, said fishing line extending through said aperture formed as part of said slip bobber and said aperture formed through said magnet.

9. The magnetic slip bobber of claim 7, wherein said receiving area is formed as part of said slip bobber, said magnet mounted to said receiving area.

10. The magnetic slip bobber of claim 7, further comprising an aperture formed as part of said line-stop such that said fishing line extends through said aperture formed as part of said line-stop.

11. The magnetic slip bobber of claim 10, wherein said line-stop is connected to said fishing line through the use of an adhesive.

12. The magnetic slip bobber of claim 7, wherein said line-stop is disconnected from said magnet by applying a sudden force to said fishing line.

13. The magnetic slip bobber of claim 7, wherein said line-stop is made from a magnetic material.

14. A magnetic slip bobber, comprising:
a fishing line having a first end and a second end, said first end for attaching to a fishing pole, and a hook located on said second end;
a flotation portion slidably connected with the fishing line, said fishing line extending through said flotation portion, said flotation portion comprising a fishing pole end portion and a hook end portion, said fishing pole end portion comprising a receiving area thereon;
a locking portion operable for immobilizing said flotation portion relative to said fishing line such that said locking portion is operable to place said hook located on said second end of said fishing line at a predetermined depth relative to said flotation portion, said locking portion comprising a magnet received within said receiving area of said flotation portion and a line-stop made of a material attracted to said magnet, said line-stop mounted on said fishing line at a location between said receiving area having said magnet and said first end of said fishing line operable for selective connection with said magnet such that when said line-stop is connected to said magnet, said hook located on said second end of said fishing line below said hook end portion of said flotation portion is maintained at said predetermined depth relative to said flotation portion; and
an aperture formed through said magnet, said fishing line operable for extending through said aperture formed through said magnet, wherein an outside diameter of said line-stop is greater than a diameter of said aperture for preventing said line-stop from moving in a direction past the magnet upon a fish striking the hook such that said flotation portion and line-stop travel as a unit with said fishing line under tension and allows selective release between said flotation portion and said line-stop upon reeling said fishing line toward said fishing pole.

15. The magnetic slip bobber of claim 14, further comprising an aperture formed as part of said floatation portion in substantial alignment with said aperture formed through said magnet such that said fishing line is operable to extend through said aperture formed as part of said floatation portion and said aperture formed through said magnet.

16. The magnetic slip bobber of claim 14, said magnet mounted in said receiving area of said flotation portion.

17. The magnetic slip bobber of claim 14, further comprising an aperture formed as part of said line-stop, said fishing line operable for extending through said aperture formed as part of said line-stop.

18. The magnetic slip bobber of claim 14, wherein said line-stop is connected to said fishing line through the use of an adhesive.

19. The magnetic slip bobber of claim 14, said flotation portion further comprising a slip bobber.

* * * * *